United States Patent
Gottwald

(10) Patent No.: US 8,041,212 B2
(45) Date of Patent: Oct. 18, 2011

(54) METHOD AND ARRANGEMENTS FOR DETERMINING THE OPTICAL SIGNAL-TO-NOISE RATIO FOR AN OPTICAL TRANSMISSION SYSTEM

(75) Inventor: Erich Gottwald, Holzkirchen (DE)

(73) Assignee: Nokia Siemens Networks GmbH & Co., Munich (DE)

( * ) Notice: Subject to any disclaimer, the term of this patent is extended or adjusted under 35 U.S.C. 154(b) by 470 days.

(21) Appl. No.: 12/373,105

(22) PCT Filed: Jul. 5, 2007

(86) PCT No.: PCT/EP2007/056807
§ 371 (c)(1),
(2), (4) Date: Jan. 14, 2009

(87) PCT Pub. No.: WO2008/006766
PCT Pub. Date: Jan. 17, 2008

(65) Prior Publication Data
US 2010/0008663 A1  Jan. 14, 2010

(30) Foreign Application Priority Data
Jul. 13, 2006  (DE) .......................... 10 2006 032 545

(51) Int. Cl.
*H04B 10/08* (2006.01)
*H04B 10/12* (2006.01)
*H04B 10/04* (2006.01)
*H04B 10/06* (2006.01)

(52) U.S. Cl. ............................ 398/26; 398/194; 398/209

(58) Field of Classification Search .................... 398/26, 398/27, 194, 209
See application file for complete search history.

(56) References Cited

U.S. PATENT DOCUMENTS
6,351,322 B1  2/2002  Ransford

FOREIGN PATENT DOCUMENTS
EP  1 303 062 A  4/2003

*Primary Examiner* — Armando Rodriguez
(74) *Attorney, Agent, or Firm* — Laurence A. Greenberg; Werner H. Stemer; Ralph E. Locher

(57) ABSTRACT

According to the invention, various noise currents are added to the electrical data signal after the opto-electric conversion of an optical data signal, and an optimum decision threshold for the electrical data signal equipped with this noise current is determined for each noise current. Values for a median signal current and for a median noise current of the amplified spontaneous emission are subsequently determined from the value pairs of the optimum decision threshold and the added noise current in accordance with a computation rule that is based on a noise model, and the optimum signal-to-noise ratio is calculated from their quotient. The method may also be advantageously implemented by means of simple expansions of common receiver devices.

14 Claims, 5 Drawing Sheets

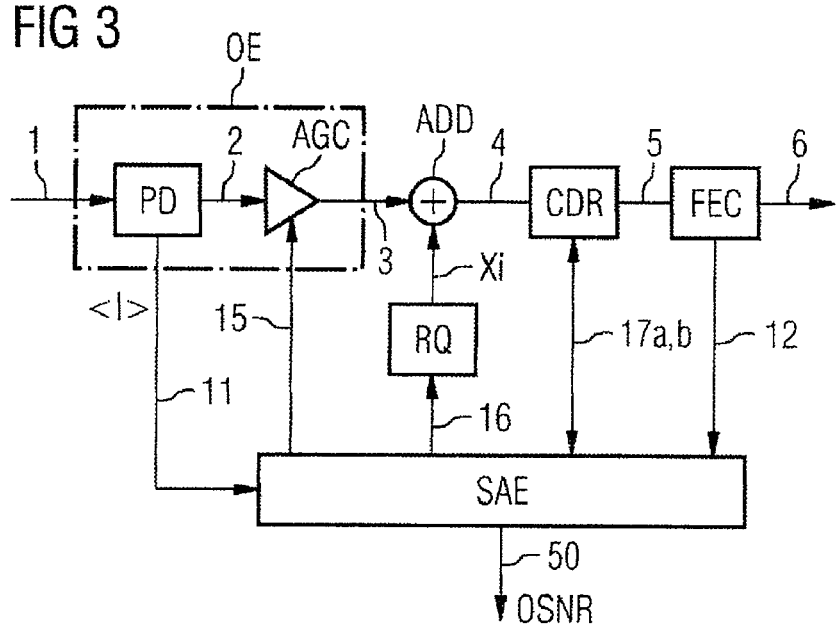
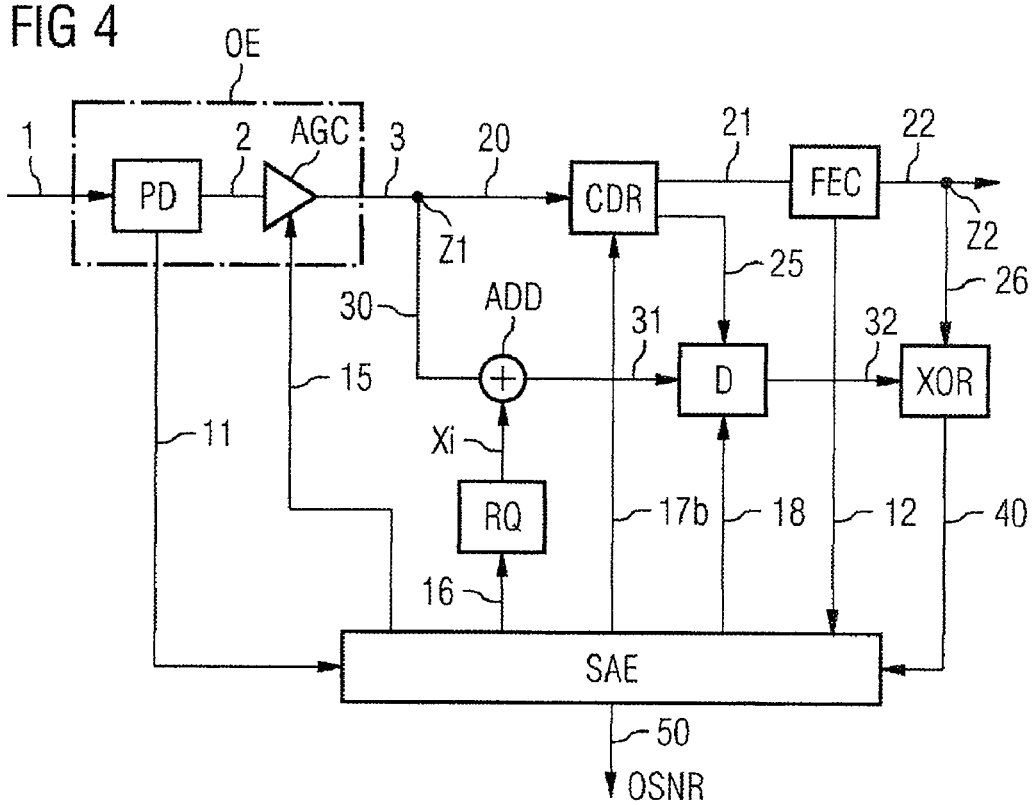

METHOD AND ARRANGEMENTS FOR DETERMINING THE OPTICAL SIGNAL-TO-NOISE RATIO FOR AN OPTICAL TRANSMISSION SYSTEM

CLAIM FOR PRIORITY

This application is a national stage application of PCT/EP2007/056807, filed Jul. 5, 2007, which claims the benefit of priority to German Application No. 10 2006 032 545.1, filed Jul. 13, 2006, the contents of which hereby incorporated by reference.

TECHNICAL FIELD OF THE INVENTION

The invention relates to a method for determining the optical signal-to-noise ratio for an optical transmission system, and to corresponding arrangements.

BACKGROUND OF THE INVENTION

The optical signal-to-noise ratio (or OSNR for short) is an important quality parameter for recording and/or determining the signal quality and for error diagnosis in optical transmission systems, in particular in long-distance traffic systems using wavelength division multiplexing (or WDM for short). The OSNR is defined as the quotient of the mean signal power and the mean noise power over a defined wavelength interval. Typically, the interval widths that are used are 1 nm or 0.1 nm, corresponding to a frequency interval of 125 GHz or 12.5 GHz, respectively, at 1550 nm.

There are numerous methods for determining the OSNR. The OSNR is normally determined by optical measurements, for example using an optical spectrum analyzer. If the channel separations are very small, for example 25 or 50 GHz, however, the values for the signal power and the noise power are difficult to separate, as a result of which OSNR measurement is virtually impossible during operation. In another optical method, the so-called "polarization nulling" method, the signal is separated on the basis of its defined polarization from the unpolarized noise, by means of polarization filters. However, this method is rather inaccurate, for example because the data signal is partially depolarized as a result of polarization mode dispersion. In addition, the complexity is relatively high because of the additionally required polarization control. In a further optical method, the OSNR is determined by briefly switching off the channel to be measured for a period in the sub-millisecond range, but this is not possible during operation.

Electrical methods also exist for determining the OSNR, in which the OSNR is determined by opto-electrical conversion of a data signal in the receiver. European patent application EP1303062 discloses a method in which the bit error rate (BER) is measured as a function of the decision threshold and is also evaluated, inter alia, with regard to the OSNR. In particular, the method also requires measurements at very high BERs close to 0.5. The areas with a high BER are located at the top and bottom edges in the eye diagram, while the areas with a low BER can be found in the inner and central area of the eye diagram. If the BER values in these areas are extrapolated, this results both in two decision threshold values for the high BERs and in two decision threshold values for the lower BERs. The size of the eye opening can be calculated from the ratio of the differences between these threshold values. If the BER is expressed by the Q-factor as in FIG. 4 of the European application, then the OSNR can be determined by determining the intersection of the two outer straight lines for the low BERs. This method has the disadvantage that it is necessary to know the absolute minimum BER in order to determine the OSNR and, because of the measurements which are required close to BER=0.5, the bit errors which occur during the measurement process can no longer be corrected by an error correction unit FEC (forward error correction).

SUMMARY OF THE INVENTION

The present invention discloses a method in which the OSNR is determined after the opto-electrical conversion of a data signal in the receiver of an optical transmission system, and a corresponding arrangement.

In one embodiment of the invention, after the opto-electrical conversion of an optical data signal, different noise currents are added to the electrical data signal and that an optimum decision threshold for the electrical data signal provided with this noise current is determined for each noise current. Values for a mean signal current and a mean noise current of the amplified spontaneous emission are then determined from the value pairs of the optimum decision threshold and the added noise current, using a calculation rule based on a noise model, and the optical signal-to-noise ratio is calculated from the quotient of these values. The invention advantageously makes it possible to determine the OSNR during operation of an optical transmission system. It can be carried out by upgrading existing receivers or can be implemented in the form of an autonomous measurement unit, and does not require optically complex measurement devices. The method is independent of data formats and data rates. The configuration of the optical signal (polarization, modulation format) is irrelevant since the method is used downstream from the opto-electrical conversion. Furthermore, it allows continuous updating of the calculation rules and software components.

In one embodiment, the optimum decision threshold is determined by minimizing the number of errors determined by means of the FEC error correction. This embodiment is distinguished in particular by its simplicity, since the optimum decision threshold is obtained using standard, already available, components such as a clock-recovery and decision-making unit CDR (unit with clock recovery, a decision maker and a regenerator) in conjunction with an error correction unit FEC.

In one embodiment, the optimum decision threshold is determined by maximizing the correlation between an electrical data signal, which has been decided and is provided with the noise current, and an electrical data signal, which has been decided but is not provided with the noise current. This embodiment variant also still works when the bit error rate becomes very high as a result of the addition of the noise current.

In another embodiment of the method, values for a signal current of logic one, for a signal current of logic zero and the mean noise current of the amplified spontaneous emission are determined using the value pairs of the optimum decision threshold and the added noise current, based on a calculation rule. These variables advantageously make it possible not only to determine the OSNR but also to make other statements relating to the transmission quality, such as the eye opening of the eye diagram, thus also making it possible to make statements about additional signal distortion. Furthermore, the power management within the transmission system can be improved by the knowledge of the mean noise current of the amplified spontaneous emission.

In a further embodiment, the calculation rule for the relationship between the optimum decision threshold is predetermined as a function of the added noise current on the basis of the Gaussian noise model. This advantageously allows the method according to the invention to be used in a versatile manner, since the Gaussian model is the most frequently used noise model.

BRIEF DESCRIPTION OF THE DRAWINGS

The invention will now be explained using exemplary embodiments and with reference to the figures, in which:

FIGS. 3-7 show block diagrams of various arrangements for determining the OSNR.

DETAILED DESCRIPTION OF THE INVENTION

Figure 1A:
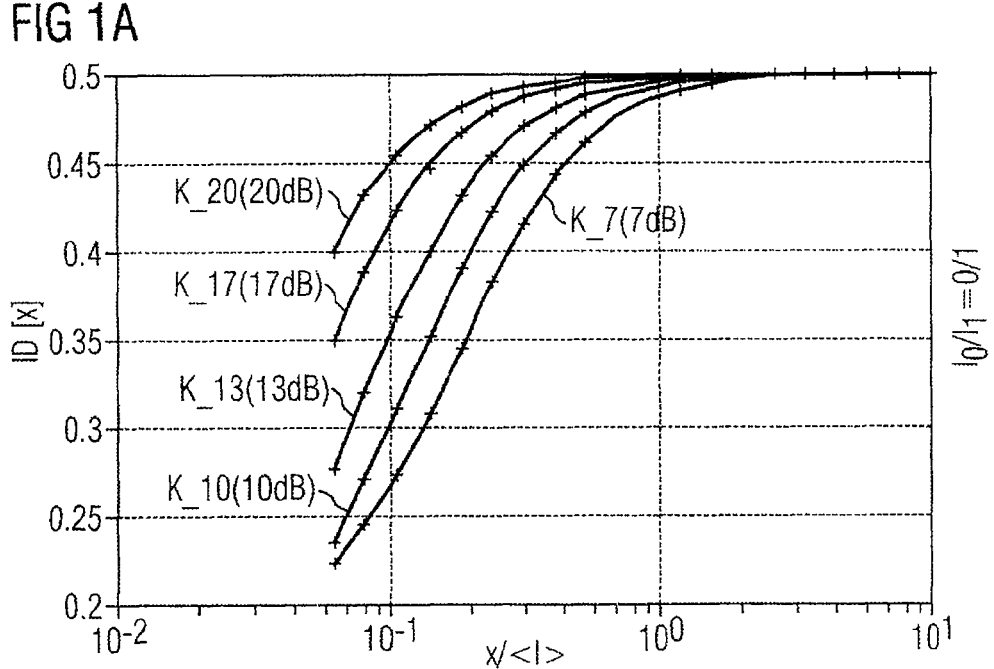
FIGS. 1a, 1b show an illustration, in the form of a graph, of the optimum decision threshold as a function of the added noise current, for various extinction ratios.

The determination according to the invention of the optical signal-to-noise ratio is based on the knowledge that, depending on the noise model that is used, the optimum decision threshold varies in a characteristic manner, which is dependent on the OSNR in the receiver, when an opto-electrically converted data signal has a defined noise current added to it upstream of the decision maker. The added electrical noise influences the variances of the probability distributions of the signal amplitudes around the signal mean values of logic one and logic zero. The form of these distributions of the signal amplitudes around the signal mean values depends on the statistics of the noise sources for the signal fluctuations. Gaussian normal distributions are frequently assumed. The variances of these Gaussian distributions correspond to the current fluctuations, caused by the noise, at the output of a photodiode. Since, in the case of noise that is caused optically, the variance of the distribution about the signal mean value of zero is always narrower than the variance of the distribution about the signal mean value of one, the relative width change of the distribution around the signal mean value of zero is greater than the relative width change of the distribution around the signal mean value of one. The distribution around the signal mean value of zero is accordingly influenced to a greater extent by the added electrical noise than the distribution around the signal mean value of one. The optimum decision threshold, for which a minimum bit error rate (BER) is always assumed in the following text, is therefore shifted. The variation of the decision threshold as a function of the added noise current is characteristic for each OSNR value. This allows the OSNR to be determined, if the relationship between the added noise and the optimum decision threshold is known.

The relationship between the added electrical noise and the optimum decision threshold will be derived in the following text with reference to one exemplary embodiment. The theoretical principles can be found in the specialist literature relating to optical transmission systems, such as the book by G. P. Agraval: "Fiber-Optic Communication Systems", Second Edition, John Wiley & Sons, New York, 1997.

An equation for the optimum decision threshold is known from equation (4.5.8), section 4.5.1 from the cited book by Agraval:

$$I_D = \frac{I_1 \cdot \sigma_0 + I_0 \cdot \sigma_1}{\sigma_0 + \sigma_1} \quad (1)$$

In equation 1, $I_0$ denotes the photodiode current for the signal mean value of logic zero (also referred to as the signal current for logic zero)

$I_1$ denotes the photodiode current for the signal mean value of logic one (also referred to as the signal current for logic one)

$\sigma_0$ denotes the variance of the Gaussian probability distribution of the signal amplitudes around the signal mean value of logic zero (which corresponds to the noise current of the logic zero signal)

$\sigma_1$ denotes the variance of the Gaussian probability distribution of the signal amplitudes around the signal mean value of logic one (which corresponds to the noise current of the logic one signal).

This has likewise been based on the Gaussian noise model that is widely used in the literature, in which the influence of linear and non-linear distortion on the distributions of the signal amplitudes around the signal mean values of zero and one is ignored.

The photocurrent which is generated in a photodiode in an optical receiving unit has, analogously to the optical signal, fluctuations which are caused by the optical noise. In addition, interference noise terms such as the interference noise between amplified spontaneous emission (ASE) and the signal or the interference noise of the ASE itself occur at the output of the photodiode. The squares of the noise currents, which naturally correspond to the variances of the distributions of the signal amplitudes (where: $\sigma_2 = \langle (\Delta I)^2 \rangle$), are composed of different noise contributions, which are each statistically independent of one another. In optical long-distance traffic systems in which an optical amplifier (preamplifier) is generally arranged upstream of the receiving unit, the noise term which is caused by the interference noise at the signal and amplified spontaneous emission (ASE) of the optical amplifier is dominant at the photodiode:

$$\sigma_{SIG\text{-}ASE}^2 = 2e^2 \cdot G \cdot F_n \cdot P_{SIG} \cdot B_e / (h \cdot f) \quad (2)$$

To a lesser extent, a noise term also occurs which is caused by interference of the ASE itself:

$$\sigma_{ASE\text{-}ASE}^2 = e^2 \cdot (G \cdot F_n)^2 \cdot B_e \cdot B_o \quad (3)$$

In this case, the variables are:

e the elementary charge

G the gain of the optical amplifier upstream of the photodiode $F_n$ the noise factor of the optical amplifier $P_{sig}$ the amplified optical data signal at the output of the optical amplifier $B_e$ the effective electrical bandwidth of the photodiode including the downstream electrical components and amplifiers $B_0$ the effective optical filter bandwidth, and h*f the energy of a photon.

According to the invention, a defined noise current x is added to the photocurrent I. This means that the variances of the Gaussian probability distributions around the signal mean value of logic zero and one are equally influenced by the added noise.

Since the noise terms are statistically independent of one another, the variances of the Gaussian probability distributions around the signal mean value of logic zero and logic one can be derived by addition of the individual noise terms, thus:

$$\sigma_0^2 = \sigma_{SIG\text{-}ASE}^2 + \sigma_{ASE\text{-}ASE}^2 + x^2$$

and $$\sigma_1^2 = \sigma_{SIG\text{-}ASE}^2 + \sigma_{ASE\text{-}ASE}^2 + x^2$$

On the assumption that the validity of the following formulae is not restricted with regard to the aim of the calculations such that each photon which arrives at the detector triggers one photoelectron, the squares of the noise currents a $\sigma_{SIG\text{-}ASE}^2$ and $\sigma_{ASE\text{-}ASE}^2$ can be expressed with the aid of the photodiode currents $$I_{SIG} = P_{SIG} \cdot \frac{e}{h \cdot f} \text{ and } I_{ASE} = F_n \cdot G \cdot B_o \cdot e$$

as a result of which, the noise contributions from equations (2) and (3) can be expressed as:

$$\sigma_{SIG\text{-}ASE}^2 = 2I_{SIG} \cdot I_{ASE} \cdot \frac{B_e}{B_o} = 2\gamma \cdot I_{ASE} \cdot I_{SIG}$$

$$\sigma_{ASE\text{-}ASE}^2 = I_{ASE}^2 \cdot \frac{B_e}{B_o} = \gamma \cdot I_{ASE}^2$$

In this case, $$\gamma = \frac{B_e}{B_o}$$

denotes the ratio of the effective electrical bandwidth at the receiver $B_e$ to an effective optical filter bandwidth $B_o$.

If the respective photodiode currents for a received logic one $I_1$ and for a received zero $I_0$ are now substituted for the signal current $I_{SIG}$, then the variances of the Gaussian probability distributions around the signal mean value of logic zero and one give:

$$\sigma_0 = \sqrt{2\gamma I_0 I_{ASE} + \gamma \cdot I_{ASE}^2 + x^2} \quad (4)$$

and $$\sigma_1 = \sqrt{2\gamma I_1 I_{ASE} + \gamma I_{ASE}^2 + x^2} \quad (5)$$

If formulae (4) and (5) are substituted in equation (1), this results in a formula for the optimum decision threshold $I_D$ as a function of an added noise current x:

$$I_D(x) = \frac{I_1 \cdot \sqrt{2\gamma I_0 I_{ASE} + \gamma \cdot I_{ASE}^2 + x^2} + I_0 \cdot \sqrt{2\gamma I_1 I_{ASE} + \gamma \cdot I_{ASE}^2 + x^2}}{\sqrt{2\gamma I_0 I_{ASE} + \gamma \cdot I_{ASE}^2 + x^2} + \sqrt{2\gamma I_1 I_{ASE} + \gamma \cdot I_{ASE}^2 + x^2}} \quad (6)$$

If the electrical noise is negligible (x->0), the formula for the optimum decision threshold changes from equation (6) to equation (1). In this case, only optical noise is present. When the noise currents that are added are very large (x->∞), equation (6) tends to the expression $(I_1+I_0)/2$, which corresponds to the situation in which the decision threshold is located precisely in the center between the signal mean values for logic zero and one. In this case, the optical noise is negligible.

Equation (6) for the optimum threshold ID(x) contains three unknown variables $I_0$, $I_1$ and $I_{ASE}$. If the optimum decision threshold $I_D(x)$ is measured for three different added noise currents $x_i$ (i=1, 2, 3), then the three unknown variables $I_0$, $I_1$ and $I_{ASE}$ can be determined.

The OSNR can be calculated in a next step, using the variables $I_0$, $I_1$ and $I_{ASE}$. Since, furthermore, the mean photodiode current <I> downstream from the photodiode is known, being composed of a mean signal current $<I_{SIG}>$ and a current $<I_{ASE}>$ caused by ASE, the OSNR can be calculated as follows:

$$OSNR = \frac{\langle I_{SIG} \rangle}{\langle I_{ASE} \rangle} = \frac{\langle I \rangle - \langle I_{ASE} \rangle}{\langle I_{ASE} \rangle} \quad (7)$$

Assuming an equal distribution of the values of $I_0$ and $I_1$, the mean signal current $<I_{SIG}>$ is identical to $<I_0+I_1>/2$.

The procedure for determining the OSNR and the photodiode currents at the signal mean values for logic zero and logic one $I_0$ and $I_1$ is accordingly as follows:

1) Insertion of noise which is white within the electrical bandwidth, upstream of the decision maker with added noise currents $x_i$, preferably from the interval {x: <I>/10<x<<I>*10}, in which case the width of the interval should be used to as great an extent as possible, and determination of the associated optimum decision thresholds $I_D(x_i)$ for at least three noise currents (i>=3).
2) Determination of the unknown variables $I_0$, $I_1$ and $I_{ASE}$ using equation (6).
3) Determination of the OSNR from equation (7).

Figure 1B:
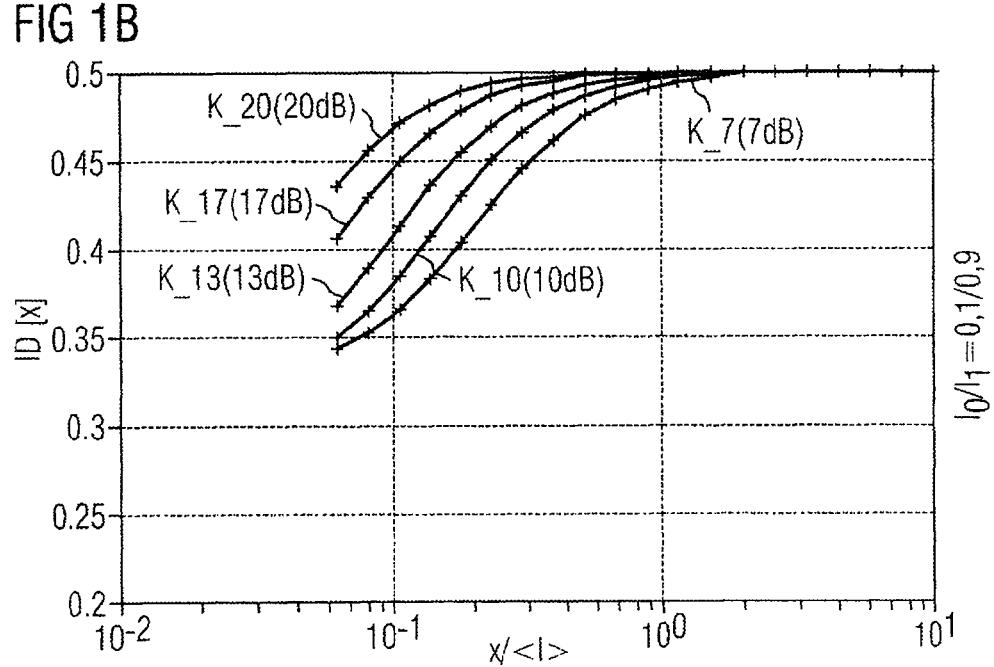

In order to demonstrate the method according to the invention, the graphs in FIGS. 1a and 1b show the relationship between the optimum decision threshold $I_D(x_i)$ and added noise currents $x_i$. In the illustrated simulations, typical values were preset for $I_0$, $I_1$ and $I_{ASE}$ and $\gamma=B_e/B_o$, with the mean photodiode current <I> in this case having been assumed to be the mean of $I_0$, $I_1$ (<I>=$(I_0+I_1)/2$). The values of different OSNR are also preset, as 7, 10, 13, 17 and 20 dB. In FIG. 1a, the ratio $I_0/I_1$ is 0.1/0.9, while in FIG. 1b a ratio of 0.2/0.8 is assumed for $I_0/I_1$. The ratio $I_0/I_1$ is the so-called extinction ratio, which is defined as the ratio of the mean values over time of the photodiode current for the logic zero and the logic one. This approximately indicates the inner eye opening in the sample time window of the decision maker. The added noise currents are in this case normalized with respect to the mean photodiode current <I>. The noise currents were varied between the values <I>/10 and <I>*10. As can clearly be seen, the decision threshold increases as the amount of electrical noise that is added increases and approaches the limit value of 0.5, at which the optical noise is negligible, and the noise that is present is predominantly electrical. If the individual points $I_D(x_i)$ are connected to one another, a specific functional relationship between the optimal decision threshold and the added noise current becomes evident for each OSNR.

Figure 2:
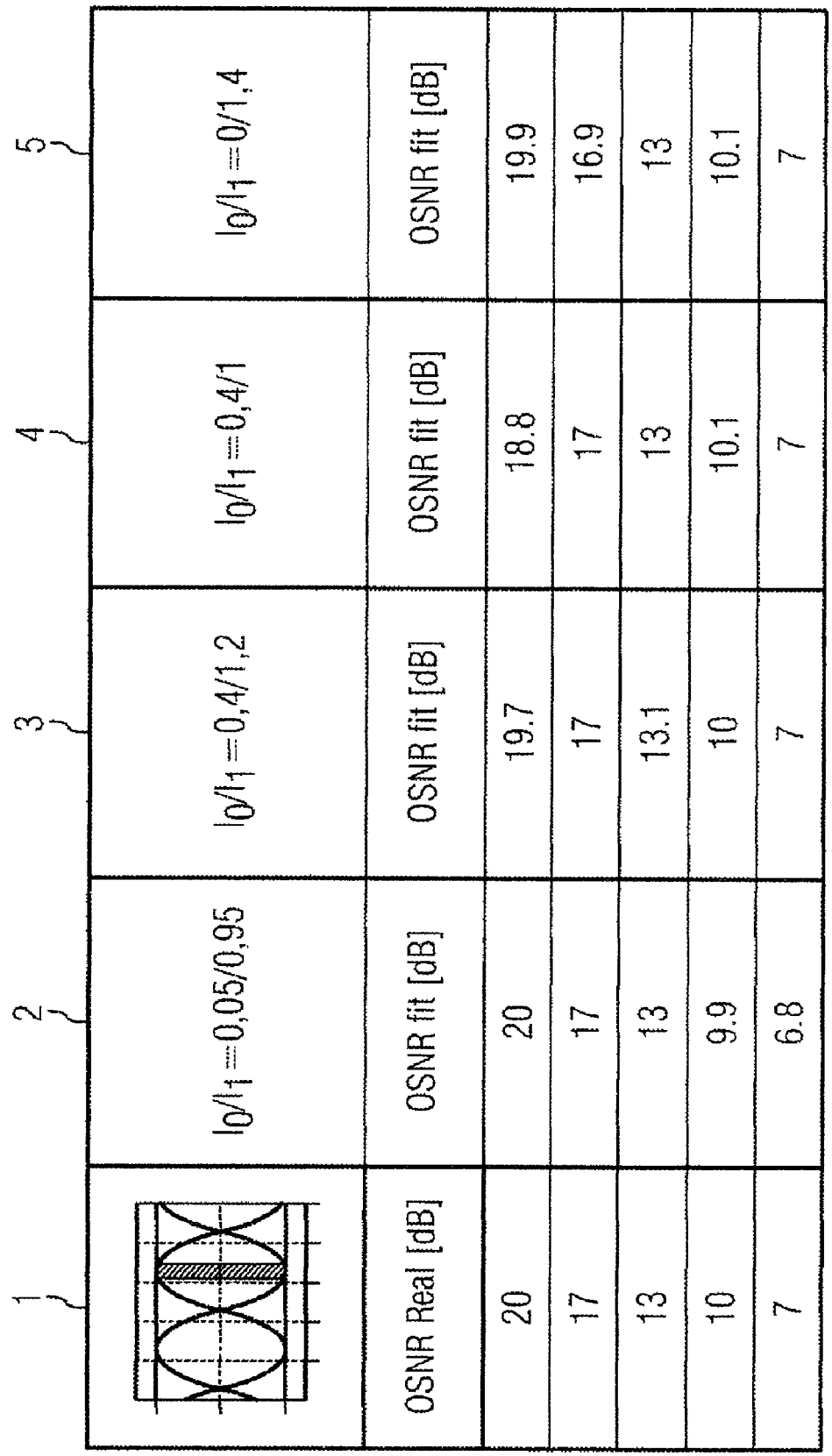
FIG. 2 shows a table of the OSNR values, determined by means of regression, in comparison to the real OSNR values for different eye openings.

In a further example to demonstrate the method according to the invention, the value pairs ($x_i$, $I_D(x_i)$) were preset and the values of the variables $I_0$, $I_1$ and $I_{ASE}$ were determined by means of a numerical fit, in order to calculate the OSNR from this, corresponding to equation (7). $I_0$ initial=<I>/10, $I_1$ initial=<I>*2 and $I_{ASE}$ initial=<I>/10 were used as initial values for the fit process. Furthermore, the resultant values of $I_0$ and $I_1$ should satisfy the constraints for different extinction ratios. The results of the simulations carried out are listed in the table in FIG. 2. The first column shows the "real" OSNR values, based on the value pairs used. Columns 2 to 5 in each case show the OSNR values obtained from the numerical fit for different extinction ratios. The extinction ratio in column 2 is $I_0/I_1=0.05/0.95$, which corresponds to an eye diagram with a large opening. The extinction ratio in column 3 of $I_0/I_1=0.4/1.2$ is relatively small. In this case, the eye opening in the eye diagram is already clearly closed. The extinction ratio in column 4 is $I_0/I_1=0.4/1$. This means that the eye opening in the eye diagram is closed from the lower values. The eye diagram in column 5 has an overshoot for an extinction of $I_0/I_1=0/1.4$. The OSNR values listed in the table show that the OSNR values calculated by means of the numerical fit provide a good match with the "real" values. Furthermore, the values from FIG. 2 demonstrate that the method is independent of any signal distortion that occurs.

In principle, for the method according to the invention:

In the case of an exact measurement, three measurement points must be sufficient, because of the three unknown variables from equation (6). The accuracy of the method can, of course, be considerably improved by using a greater number of measurement points and by repeatedly carrying out the measurements and averaging the results, or by means of a fit of the unknown variables ($I_0$, $I_1$ and $I_{ASE}$) using equation (6). Furthermore, the Gaussian model is not a precondition for the fundamental operation of the method according to the invention. Other noise models are likewise permissible. All that is necessary is to match the formulae for the evaluation procedures appropriately to the noise model that is used. The only significant factor for the operation of the method is that the variances of the distributions of the signal amplitudes around the signal mean values for logic zero and one are influenced differently by the electrically added noise power, as a function of the OSNR.

FIGS. 3 to 7 show different embodiment variants for the implementation of the method according to the invention.

The block diagram in FIG. 3 shows a first arrangement for determining the OSNR. An optical data signal 1 is supplied to an optical conversion unit OE. By way of example, this comprises a photodiode PD with a downstream electrical amplifier AGC. A first signal 11 is passed from the photodiode PD to a control and evaluation unit SAE. A second signal 2 is supplied to the electrical amplifier AGC which, in addition to a first input for the signal 2, has a second input for a first control signal 15, which is emitted by the control and evaluation unit SAE. The electrical data signal 3 which is emitted by the electrical amplifier AGC is supplied to a first input of an adder ADD. The second input of the adder ADD is connected to a noise source RQ, which supplies a noise current 20 to the adder ADD. The noise source RQ receives a second control signal 16 from the control and evaluation unit SAE. The output of the adder ADD passes the data signal 4, provided with noise, to a first input of a clock-recovery and decision-making unit CDR, whose second input is supplied with a third control signal 17 from the control and evaluation unit SAE. From the output of the clock-recovery and decision-making unit CDR, the data signal 5 which has been decided is supplied to an error correction unit FEC, which emits, at its first output, the corrected data signal 6 which has been decided and, at its second output, a second signal 12 to the control and evaluation unit SAE.

The optical signal 1, which is composed of the ASE and the actual data signal, is supplied to an optical conversion unit OE which, in the exemplary embodiment illustrated in FIG. 3, comprises a photodiode PD with a downstream electrical amplifier AGC. The optical data signal 1 is opto-electrically converted in the photodiode PD. Since the photocurrent generated in the photodiode PD is necessary for calculation of the OSNR, a first signal 11, which corresponds to the mean photocurrent <I>, is emitted to the control and evaluation unit SAE. The opto-electrically converted data signal 2 is then supplied to the electrical amplifier AGC, where the level of the converted electrical signal 2 is set appropriately for the downstream clock-recovery and decision-making unit CDR. The level setting is carried out in accordance with the preset from the control and evaluation unit SAE via the first control signal 15. When an optical preamplifier is present, care must be taken to ensure that the electrical noise of the amplifier AGC is negligible. Defined noise currents $x_i$ are added to the electrical data signal 3 in an analogously designed adder ADD. The noise currents $x_i$ are generated in the noise source RQ. The noise source RQ is controlled via a second control signal 16 in accordance with the preset from the control and evaluation unit SAE. The clock-recovery and decision-making unit CDR with the downstream error correction unit FEC, together with parts of the control and evaluation unit SAE, form a functional block for determination of the optimum decision threshold $I_D(x_i)$. The clock-recovery and decision-making unit (or CDR for short) essentially comprises a decision-making circuit and clock recovery. The decision-making circuit contains a threshold-value switch. The decision-making circuit compares the level of the incoming signal with a threshold value at specific sampling times, which are supplied by the clock recovery, and decides whether the sampled value is a logic zero or a logic one. This means that the clock-recovery and decision-making unit CDR itself provides a decision threshold and a sampling time, and emits them to the control and evaluation unit SAE via the signal 17a. The signal that has been decided is then supplied to the error correction unit FEC where existing bit errors which occur during the transmission and now also as a result of the added noise current are corrected. The number of bits corrected by the FEC is a direct measure of the bit error rate (BER), and this is emitted to the control and evaluation unit SAE via the error correction signal 12. The control and evaluation unit SAE now sets the decision threshold and the sampling time in the CDR, within a control loop, using the signal 17b, such that the number of incorrect bits determined by the FEC, and therefore the bit error rate, is minimized. An optimum decision threshold is determined in this way. The control and evaluation unit SAE uses the supplied and set values to calculate the OSNR 50, and emits this to superordinate system management.

The block diagram from FIG. 4 shows a second arrangement for determining the OSNR, which, as in FIG. 3, comprises an optical conversion unit OE which, by means of the photodiode PD, allows opto-electrical conversion of the supplied optical data signal 1 with a defined output level. The mean level of the output signal 2 from the photodiode is in this case likewise set to a predetermined value by means of an electrical amplifier AGC. The electrical data signal 3 is then split at the first junction point Z1 into a reference signal 20 and a signal element 30. The reference signal 20 is evaluated and regenerated in the clock-recovery and decision-making unit CDR. The amplitudes of the data signal are set to a zero level or one level in the decision-making circuit of the clock-recovery and decision-making unit CDR, at the sampling times preset by the clock recovery. The data signal 21 which has been decided in this way is supplied to an error correction unit FEC which, at its first output, emits a data signal 22 which has been decided and has no errors. A second junction point Z2 is located downstream from the error correction unit FEC, and is used to supply a signal element 26 of the error-corrected data signal 22, which has been decided, to a comparison unit XOR. Defined noise currents $x_i$ are added via the adder ADD to the signal element 30 tapped off downstream from the first junction point Z1, with these noise currents $x_i$ being produced in the noise source RQ. The noise current $x_i$ is set at the noise source RQ via the control signal 16 from the control and evaluation unit SAE. The data signal 31, with the electrical noise superimposed on it, is then supplied to a decision maker D. The sampling times of the decision-making circuit D are preset via the clock signal 25 from the clock recovery of the clock-recovery and decision-making unit CDR. This is absolutely essential in order to allow the downstream comparison unit XOR to carry out a bit-by-bit comparison of the data signals 32 and 26 which have been decided. Furthermore, no specific clock recovery is required because the clock signal is supplied in the decision maker D. Just a unit for phase matching of the data signal for the optimum sampling time is sufficient in the decision maker D, and this costs less than specific clock recovery. The comparison unit which, for example, comprises an XOR gate produces a logic zero when the values to be compared and applied to the input are the same. The signal 40 emitted at the output of the XOR gate is accordingly minimal when the signal 26, which has been decided to have no errors, matches to as great an extent as possible the signal 32 which is subject to errors because of the noise added to it. The control and evaluation unit SAE can now use the information from the XOR gate to determine the optimum decision threshold, and can signal this to the decision maker D via the control signal 18. The optimization of the decision threshold for the decision maker D is in this exemplary embodiment accordingly carried out by minimizing the errors in the bit-by-bit comparison of the signals in the decision-making branch without additional noise, and in the decision-making branch with additional noise. The decision threshold $I_D$ of the upper decision-making branch without additional noise is optimally set via the signal 17 on the basis of the number of errors (signal 12) supplied from the FEC. The decision threshold $I_D(x_i)$ of the decision maker D is set by the signal 18 as a function of the result from the XOR gate. This allows the control and evaluation unit SAE to determine a functional relationship between the added noise current and the optimum decision threshold for the decision maker D. The embodiment with the XOR gate is a simple circuit, in order to measure correlations. Any desired correlator can also be used, instead of the XOR gate.

The embodiment variant illustrated in FIG. 4 has the advantage over the embodiment variant shown in FIG. 3 that the optimum decision threshold can also be determined for higher bit error rates. If the number of errors that occur in the arrangement shown in FIG. 3 as a result of the addition of noise to the data signal becomes so great that they can no longer be corrected by the error correction unit FEC, the implementation variation shown in FIG. 4 can be used, which operates even with high error rates. In FIG. 4, the data signal which is used as a reference signal for the comparison in the XOR gate is advantageously not subject to interference from the addition of noise. This ensures that the circuit is always operated optimally.

Figure 5:
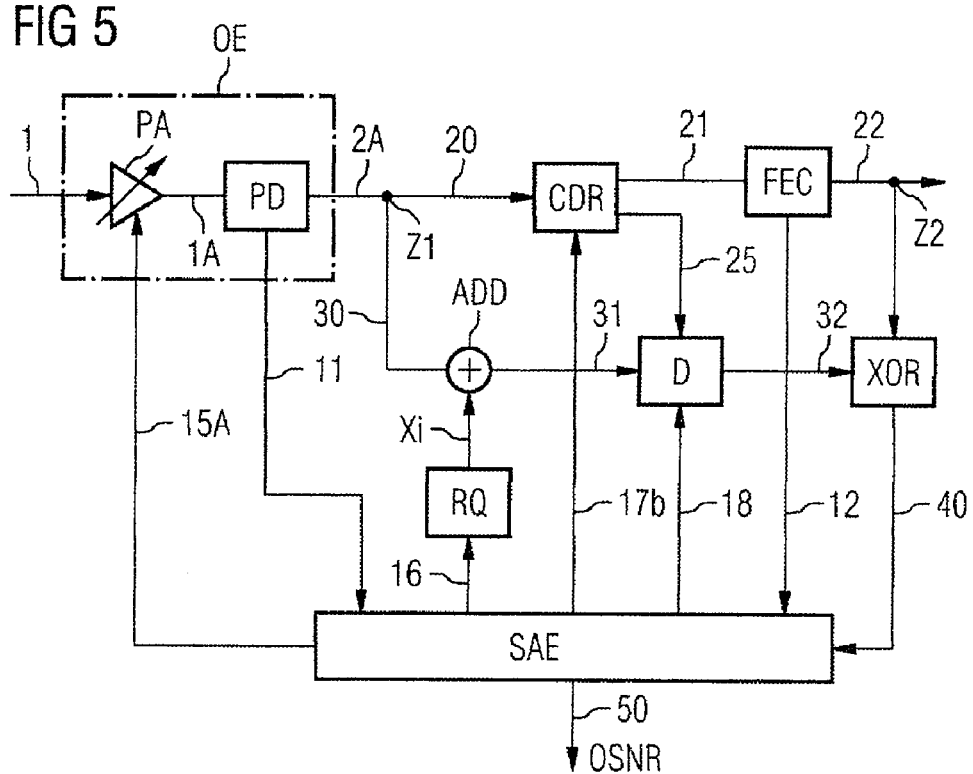

The arrangement, as illustrated in the block diagram in FIG. 5, for determining the OSNR has, in comparison to the arrangement shown in FIG. 5, an optical conversion unit OE which comprises an optical amplifier PA with a downstream photodiode PD. The optical signal 1 is in this case amplified in the optical preamplifier PA to a value which is predetermined via the control signal 15A from the control and evaluation unit SAE. This value is dependent on the requirements of the decision-making circuits within the clock-recovery and decision-making unit CDR and within the decision maker D. The optical signal 1A which has been preamplified in this way is then opto-electrically converted in the photodiode PD. An optical attenuator can also be used, instead of the optical amplifier PA that is shown. In addition to level setting of the optical signal, a combination of level control before and after the photodiode is also feasible. The insertion of optical or electrical filters in the area of the optical conversion unit OE in order to limit the bandwidths and noise of the optical or electrical signal is likewise possible.

Figure 6:
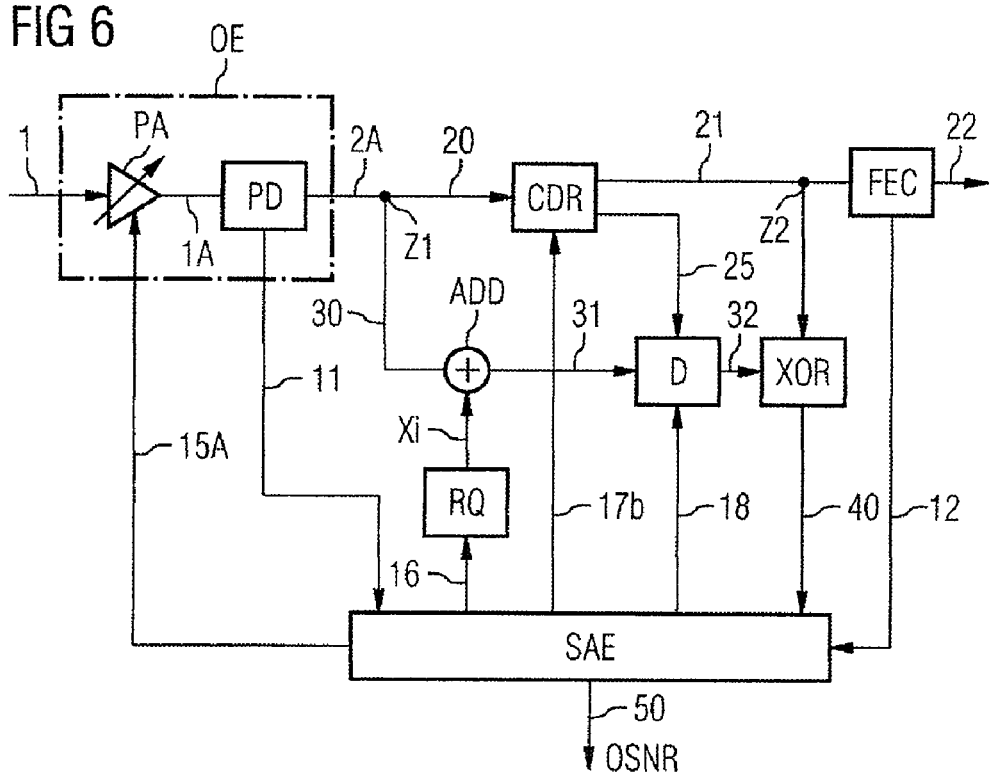

FIG. 6 shows a variant of an arrangement for determining the OSNR in which the comparison between the signals of the decision-making branch without additional noise and the signals of the decision-making branch with additional noise is carried out before the data signal 21 which has been decided passes through the error correction unit FEC. The number of bits which have been corrected in the error correction unit FEC is used in the control and evaluation unit SAE, as in the previous embodiment variants, in order to optimize the decision threshold and the sampling time of the clock-recovery and decision-making unit CDR. The number of corrected bits is for this propose transmitted via the signal 12 to the control and evaluation unit SAE.

Figure 7:
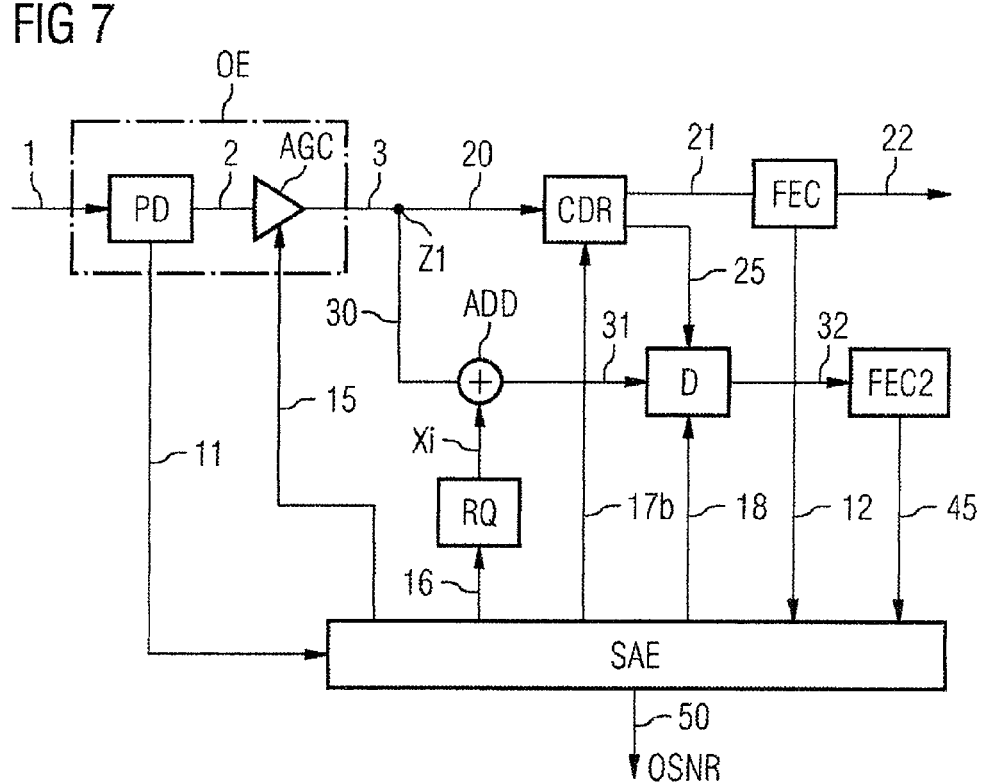

FIG. 7 shows a variant of an arrangement for determining the OSNR, in which a second error correction unit FEC2 is used instead of the comparison unit XOR, and supplies a second error correction signal 45 to the control and evaluation unit SAE. The embodiment variant illustrated in FIG. 7 essentially matches that shown in FIG. 4. However, in this exemplary embodiment, the decision threshold for the decision maker D is optimized via the second error correction unit FEC2. The decision threshold $I_D$ of the upper decision-making branch without additional noise is optimally set, via the signal 17, on the basis of the number of errors (signal 12) as supplied by the first error correction unit FEC.

It should also be noted that there is no need for an error correction unit FEC in order to determine the optimum decision threshold if other methods are provided for error correction and/or error measurement. In principle, for example in the case of signal formats such as SDH and Sonet signals, the corresponding error bytes in the frame signal can be evaluated instead of an error output of the FEC unit in order to determine the optimum decision threshold. However, this method is slower, and an extra SDH chip is much more expensive than an FEC module. Furthermore, the demultiplexer unit of the receiver must then also be included, and the arrangement is no longer flexible with regard to the data format. However, if the optimum thresholds are determined via error correction and/or error measurement contained in the frame, errors must be present which would interfere with the data signals in the exemplary embodiment shown in FIG. 3, and would result in considerably higher costs in the other embodiments with the parallel branch.

The invention claimed is:

1. A method for determining an optical signal-to-noise ratio for an optical transmission system,
    comprising:
    opto-electrically converting, at the receiving end, a transmitted optical data signal to an electrical data signal;
    adding noise currents having at least three different values to the electrical data signal;
    determining an optimum decision threshold for an electrical data signal which is provided with this noise current for each added noise current;
    determining values for a mean signal current and a mean noise current of the amplified spontaneous emission from value pairs, which comprise the added noise current and the corresponding optimum decision threshold, using a calculation rule which is based on a noise model; and determining the optical signal-to-noise ratio from the quotient of the mean signal current and the mean noise current of the amplified spontaneous emission.

2. The method as claimed in claim 1, wherein a signal value for the electrical data signal provided with the noise current is determined to a logic one or a logic zero, any signal-value errors that occur are corrected and the number of corrected errors is determined, and the optimum decision threshold is determined by minimizing the error rate as determined by means of the corrected errors.

3. The method as claimed in claim 1, wherein the optimum decision threshold is determined by maximizing a correlation between an electrical data signal, which has been decided and is provided with the noise current, and an electrical data signal, which has been decided but is not provided with the noise current.

4. The method as claimed in claim 1, wherein the added noise currents lie in an interval between one tenth of the mean photocurrent of the electrical data signal and ten times the mean photocurrent of the electrical data signal.

5. The method as claimed in claim 1, wherein values for a signal current of logic one, for a signal current of logic zero and the mean noise current of the amplified spontaneous emission are determined from the value pair of the added noise current and the optimum decision threshold using a calculation rule.

6. The method as claimed in claim 1, wherein, assuming a Gaussian noise model, a calculation rule for the optimum decision threshold as a function of the added noise current is equal to:

$$I_D(x) = \frac{I_1 \cdot \sqrt{2\gamma I_0 I_{ASE} + \gamma \cdot I_{ASE}^2 + x^2} + I_0 \cdot \sqrt{2\gamma I_1 I_{ASE} + \gamma \cdot I_{ASE}^2 + x^2}}{\sqrt{2\gamma I_0 I_{ASE} + \gamma \cdot I_{ASE}^2 + x^2} + \sqrt{2\gamma I_1 I_{ASE} + \gamma \cdot I_{ASE}^2 + x^2}}$$

where $I_1$ represents the signal current of logic one, $I_0$ represents the signal current of logic zero, $I_{ASE}$ represents the noise current of the amplified spontaneous emission, $\gamma$ represents a quotient of an effective electrical bandwidth at the receiver divided by an effective optical filter bandwidth.

7. An arrangement for determining the optical signal-to-noise ratio for an optical transmission system, comprising:

a series circuit of an opto-electrical transducer, an adder, a clock-recovery and decision-making unit and an error correction unit, having an optical data signal is supplied to an input side and emits an electrical data signal on an output side which has been decided, in which a variable noise source is provided, whose output is connected to the adder;

a control and evaluation unit is provided, which is connected to the opto-electrical transducer, to the noise source, to the clock recovery and decision-making unit, and to the error correction unit, wherein an optimum decision threshold is determined in the control and evaluation unit by means of a first input signal, which is supplied from the opto-electrical transducer, a second input signal which is supplied by the clock-recovery and decision-making unit, and an error correction signal, which is supplied by the error correction unit, as a function of a first control signal which is supplied to the noise source, and the optimum decision threshold is emitted to the clock-recovery and decision-making unit via a second control signal, and after at least three settings of the noise current and of the optimum decision threshold, a value for the optical signal-to-noise ratio is determined and is emitted to the system management.

8. The arrangement as claimed in claim 7, wherein the opto-electrical transducer is preceded by an optical unit for level setting or is followed by an electrical unit for level setting, and the unit for level setting is connected to the control and evaluation unit and receives a control signal therefrom.

9. An arrangement for determining the optical signal-to-noise ratio for an optical transmission system, comprising:

an opto-electrical transducer which has an input for an optical data signal and in which the optical data signal is opto-electrically converted, and having a first electrical data signal and a second electrical data signal emitted from a first and second output, respectively;

a first junction point, having an input to which the first electrical data signal is supplied and is split into a reference signal and a first signal element;

a clock-recovery and decision-making unit having a first input for the reference signal and a second input for a second control signal, and in which the reference signal is regenerated and decided, and which emits, at its first output, a first data signal which has been decided and, at its second output, emits a clock signal;

an adder which has a first input for the first signal element and a second input for a noise signal which is emitted by a noise source, in which adder the noise signal is added to the first signal element and having an output on which an electrical data signal on which noise is superimposed is emitted;

a decision maker, with a first input on which the electrical data signal with noise superimposed on it is supplied, with a second input on which the clock signal is supplied, with a third input on which a third control signal is supplied, and in which an optimum decision threshold is set for the noisy electrical data signal and having an output on which a second data signal, which has been decided, is emitted;

a comparison unit, having a first input in which the first data signal which has been decided is supplied, a second input in which the second data signal which has been decided is supplied, in which the two signals are compared, and having an output in which a comparison signal with the comparison result is emitted;

a control and evaluation unit, which has a first input for the second electrical data signal and a second input for the comparison signal, in which a value for the optimum decision threshold for the clock-recovery and decision-making unit is determined and is emitted thereto via the second control signal, wherein a further value for the optimum decision threshold for the decision maker is determined and is emitted thereto via the third control signal, a fourth control signal for the noise source is generated and is emitted thereto, and, based on at least three set value pairs, the optical signal-to-noise ratio is determined from the noise signals and the optimum decision thresholds, and is emitted to system management.

10. The arrangement as claimed in claim 9, further comprising an error correction unit having an input in which the first data signal which has been decided is supplied, in which existing bit errors are corrected, and which emits at its first output a corrected data signal which has been decided, and emits at its second output an error correction signal, wherein the error correction signal is used for determining the optimum decision threshold for the clock-recovery and decision-making unit.

11. The arrangement as claimed in claim 8, wherein the opto-electrical transducer is preceded by an optical unit for level setting or is followed by an electrical unit for level setting, and the unit for level setting is connected to the control and evaluation unit and receives a control signal therefrom.

12. The arrangement as claimed in claim 9, wherein the comparison unit is in the form of an XOR gate or a comparator.

13. The arrangement as claimed in claim 9, wherein the comparison unit is in the form of a second error correction unit, in which any existing bit errors in the second data signal which has been decided are corrected and which emits at its output a second error correction signal, wherein the data signal is used in the control and evaluation unit to determine the optimum decision threshold for the decision maker.

14. An optical receiving unit, having an arrangement for determining the optical signal-to-noise ratio, comprising:
   a series circuit of an opto-electrical transducer, an adder, a clock-recovery and decision-making unit and an error correction unit, having an optical data signal supplied to an input side and emits an electrical data signal on an output side which has been decided,
in which a variable noise source is provided, whose output is connected to the adder;
   a control and evaluation unit is provided, which is connected to the opto-electrical transducer, to the noise source, to the clock recovery and decision-making unit, and to the error correction unit,
   wherein an optimum decision threshold is determined in the control and evaluation unit by a first input signal, which is supplied from the opto-electrical transducer, a second input signal which is supplied by the clock-recovery and decision-making unit, and an error correction signal, which is supplied by the error correction unit, as a function of a first control signal which is supplied to the noise source, and the optimum decision threshold is emitted to the clock-recovery and decision-making unit via a second control signal, and
   after at least three settings of the noise current and of the optimum decision threshold, a value for the optical signal-to-noise ratio.

* * * * *